United States Patent [19]
Tono et al.

[11] Patent Number: 5,200,250
[45] Date of Patent: Apr. 6, 1993

[54] PHOSPHORS, METHOD FOR TREATING THE SURFACE THEREOF AND PROCESS FOR PRODUCING A PHOSPHOR SCREEN

[75] Inventors: Hideo Tono; Kazuhito Iwasaki, both of Odawara, Japan

[73] Assignee: Kasei Optonix, Ltd., Tokyo, Japan

[21] Appl. No.: 600,208

[22] Filed: Oct. 19, 1990

[30] Foreign Application Priority Data

Oct. 20, 1989 [JP] Japan .................................. 1-271825

[51] Int. Cl.$^5$ .............................................. B32B 3/00
[52] U.S. Cl. ............................ 428/144; 252/301.6 R; 313/365; 313/463; 313/466; 428/147; 428/403; 428/407; 428/690
[58] Field of Search ............... 428/403, 404, 407, 690, 428/144, 147; 313/465, 365, 467, 463; 252/301.6 R

[56] References Cited

U.S. PATENT DOCUMENTS

| | | | |
|---|---|---|---|
| 4,049,845 | 9/1977 | Lozier et al. | 428/407 |
| 4,206,250 | 6/1980 | Oba et al. | 428/403 |
| 4,287,257 | 9/1981 | Ohmatoi et al. | 428/403 |
| 4,711,827 | 12/1987 | Christini | 428/690 |
| 5,017,440 | 5/1991 | Bills et al. | 428/690 |

FOREIGN PATENT DOCUMENTS 0184201 6/1986 European Pat. Off. .
3433963 3/1986 Fed. Rep. of Germany .

OTHER PUBLICATIONS

European Search Report.

Primary Examiner—P. C. Sluby
Assistant Examiner—Hoa T. Le
Attorney, Agent, or Firm—Oblon, Spivak, McClelland, Maier & Neustadt

[57] ABSTRACT

A phosphor comprising phosphor particles and a surface treating material attached or coated on the phosphor particles, wherein said surface treating material comprises zinc and a polycarboxylic acid.

14 Claims, 7 Drawing Sheets

PHOSPHORS, METHOD FOR TREATING THE SURFACE THEREOF AND PROCESS FOR PRODUCING A PHOSPHOR SCREEN

BACKGROUND OF THE INVENTION

1. Field of Invention

The present invention relates to phosphors, a method for treating the surface thereof and a process for producing a phosphor screen. Particularly, it relates to phosphors for cathode ray tubes having improved coating properties for the preparation of a phosphor screen.

2. Description of Prior Arts

A typical process for preparing a phosphor screen for a color picture tube comprises dispersing a phosphor in a photosensitive resin solution such as polyvinyl alcohol activated by ammonium dichromate, to obtain a phosphor slurry, coating this phosphor slurry on a glass panel, and irradiating ultraviolet rays in a prescribed pattern through a shadow mask to cure and insolubilize the resin. Then, with a developer such as warm water, the portions not irradiated with ultraviolet rays are dissolved and removed. This operation is repeated three times with respect to three colors (blue, green and red) to form a phosphor screen in the form of stripes or dots.

In the process for forming such a phosphor screen, the phosphor is required to satisfy the following conditions:

(1) The phosphor screen must be dense and have little pin holes or the like.

(2) One light emitting phosphor component must not intermix with other light emitting elements (stripes or dots), i.e. cross color contamination must not occur.

(3) Formation of the light emitting elements must be excellent, i.e. the edges of the stripes must be straight, the edges of dots must be circular, and the edges must be sharp.

(4) The phosphor photosensitive solution must have a high level of light exposure sensitivity, and the photocuring speed by ultraviolet rays is high so as to provide good working efficiency.

(5) During the process of exposure and development, the portions cured by irradiation with ultraviolet rays must have strong bond strength, and the phosphor screen at such portions must not fall off from the glass panel by high pressure aqueous development treatment.

A phosphor having zinc hydroxide deposited thereon is known as a phosphor having conditions (2) and (4) improved among the above conditions. (U.S. Pat. No. 4,287,257)

In recent years, a finer image is required for a color picture tube in order to improve the image quality. For this purpose, it is necessary to form fine picture elements (stripes or dots). In order to consistently form fine picture elements on a glass panel, it is important that the bond strength of the phosphor to the glass panel is strong and no cross color contamination will take place. As a method for increasing the bond strength of the phosphor, there may, for example, be mentioned a method wherein a phosphor suspension coated in a process step prior to the development is forcibly dried to form a strong phosphor layer. However, there is a problem that the stronger the phosphor layer prior to the development, the more likely fogging will result on other colors.

The above mentioned phosphor having zinc hydroxide coated thereon has a limit in the level of forming a highly fine image. Further, even if the amount of zinc hydroxide coated is increased, no adequate improvement is attainable in the prevention of fogging. On the contrary, such an increase tends to increase the coagulation of the zinc hydroxide colloid, whereby the dispersibility of the phosphor in the suspension tends to be poor, thus leading to a decrease in the bond strength or a deterioration such as breakage of the edges or formation of pin holes.

BRIEF SUMMARY OF THE INVENTION

It is an object of the present invention to provide a phosphor having the bond strength and the dispersibility improved while maintaining the desirable characteristics of the conventional phosphor having zinc hydroxide coated, such as excellent exposure sensitivity or prevention of color mixing, a method for treating the surface of such a phosphor and a process for producing a phosphor screen.

The present invention provides (1) a phosphor comprising phosphor particles and a surface treating material attached or coated on the phosphor particles, wherein said surface treating material comprises zinc and a polycarboxylate, (2) a method for treating the surface of a phosphor, which comprises adding to a suspension of the phosphor a surface treating agent which provides zinc ions and polycarboxylic acid ions in an aqueous solvent, and adjusting the pH to a level of from 6.5 to 10 with an alkaline solution, and (3) a process for producing a phosphor screen, which comprises coating the phosphor of above item (1) on the surface of a panel, followed by baking.

DETAILED DESCRIPTION OF THE INVENTION

Now, the present invention will be described in detail with reference to the preferred embodiments.

In the accompanying drawings:

FIGS. 1(*a*) and (*b*) are electron microscopic photographs of the particle structure of the phosphor obtained in Example 1.

FIGS. 2(*l*) and (*b*) are electron microscopic photographs of the particle structure of the phosphor obtained in Comparative Example 1.

The polycarboxylic acid and a salt thereof to be used in the present invention include a carboxylic acid having at least two carboxyl groups per molecule and at the same time containing a hydroxyl group in the molecule i.e. an oxycarboxylic acid. Specific examples of such a polycarboxylic acid and a salt thereof include oxalic acid, tartaric acid, malic acid, malonic acid, maleic acid, fumaric acid and phthalic acid as acids having two carboxyl groups, and citric acid and tricarballylic acid as acids having three carboxyl groups, and salts thereof.

The amount of the polycarboxylic acid ions added to the phosphor suspension is preferably from 50 to 10,000 ppm relative to the weight of the phosphor.

Further, as an assistant to stabilize the attachment of the surface treating material to the phosphor, it is preferred to incorporate at least one member selected from the group consisting of aluminum hydroxide, alumina sol, zinc phosphate, magnesium phosphate, aluminum phosphate, barium phosphate, calcium phosphate, zinc pyrophosphate, calcium pyrophosphate, magnesium pyrophosphate, aluminum pyrophosphate, colloidal silica, ionic silica and powdery silica. It is particularly preferred to incorporate alumina sol, zinc phosphate or ionic silica.

For the addition of zinc ions to the phosphor suspension, it is possible to use at least one water-soluble zinc compound selected from the group consisting of zinc sulfate, zinc acetate, zinc nitrate and zinc halides (provided that fluorine is excluded from the halogen). The amount of the zinc ions added to the phosphor suspension is preferably from 100 to 30,000 ppm relative to the weight of the phosphor.

As an alkaline solution to adjust the pH of the phosphor suspension, an alkali metal hydroxide such as sodium hydroxide, potassium hydroxide or ammonium hydroxide, may be employed. By reacting the above water-soluble zinc compound with the above alkaline solution in the presence of the above polycarboxylic acid ions, a zinc compound modified by the polycarboxylic acid ions, can be obtained.

According to the present invention, a colloid of zinc hydroxide partially modified by the polycarboxylic acid ions is attached or coated on the surface of phosphor particles to obtain a phosphor for slurry coating, whereby the adhesion strength and the dispersibility can be improved, and it is possible to prevent falling off of the phosphor layer during the development or formation of pin halls or fogging.

A typical procedure for the surface treatment of a phosphor will be described. Firstly, a phosphor is put in deionized water and thoroughly suspended, and an aqueous solution of a polycarboxylic acid or a salt thereof is added thereto. The mixture is again suspended. Further, an aqueous solution containing zinc ions is added thereto.

Figure 3:
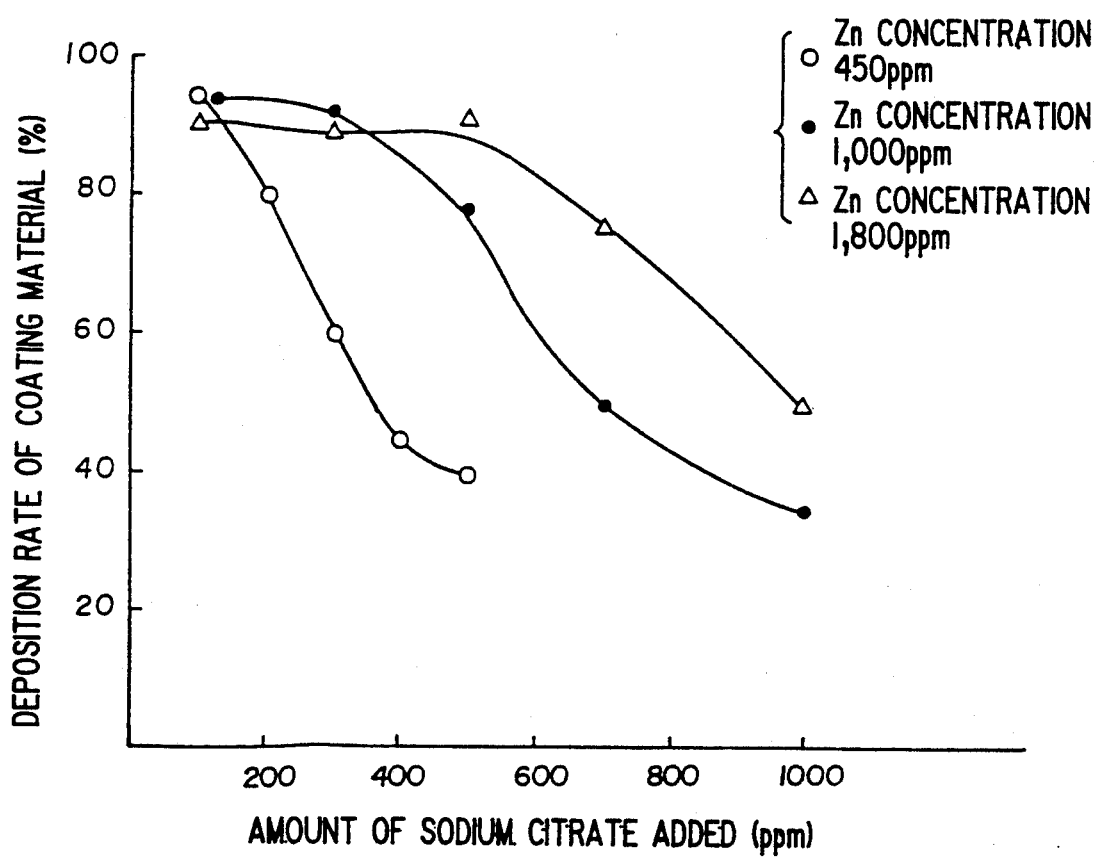
FIG. 3 is a graph showing the relation between the amounts of sodium citrate and zinc ions added, and the attached rate of the zinc compound on the surface of phosphors.

FIG. 3 shows the results of investigation for the attached rate of a zinc compound when the amount of sodium citrate added was changed. As is apparent from this Figure, for example, in the case where the zinc ion concentration is 1,000 ppm, the attached rate of the zinc compound tends to decrease as the amount of sodium citrate added increases.

Then, an aqueous alkaline solution was gradually added to this suspension to adjust the pH.

Figure 4:
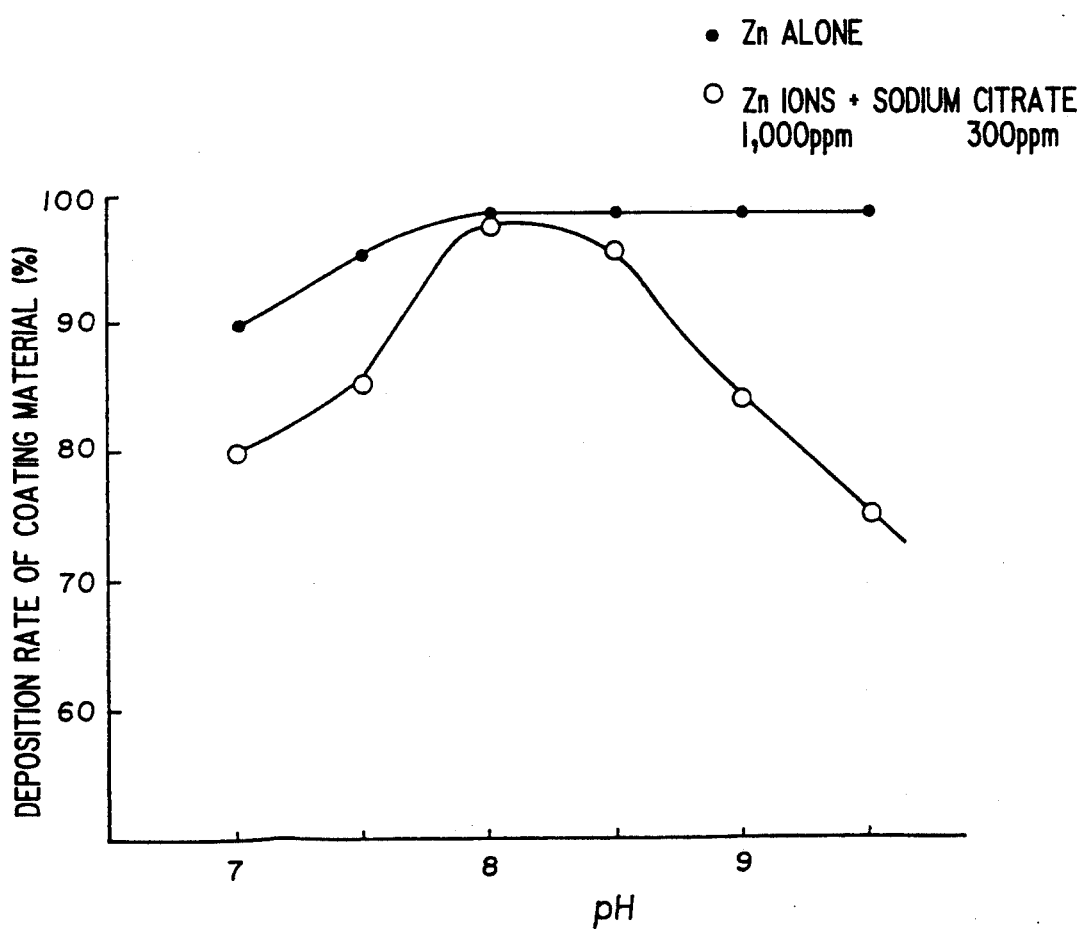
FIG. 4 is a graph showing the relation between the attached rate of the zinc compound on the surface of phosphors and the pH of the phosphor suspension.

FIG. 4 shows the results of investigation of the pH dependability of the attached rate of zinc compound to a phosphor when the pH was changed. As is apparent from this Figure, a preferred pH range is from 6.5 to 10.

As a result, the zinc compound colloid containing the polycarboxylate consistently precipitates and deposits on the surface of the phosphor. The phosphor suspension is left to stand and to let the phosphor having the colloid attached thereon sediment. Then, the supernatant is removed, and washing by decantation with deionized water is repeated a few times, followed by filtration and dehydration. The dehydrated cake is dried at a temperature of from 100° to 150° C., and the bulky phosphor is disintegrated by a sieve to obtain a desired phosphor.

Figure 1A:

The phosphor thus obtained has particles uniformly deposited on its surface as shown in the electron microscopic photographs of FIGS. 1(a) and (b).

Whereas, in the conventional phosphor having only zinc hydroxide attached without adding the polycarboxylic acid ions (U.S. Pat. No. 4,287,257), zinc hydroxide is nonuniformly attached in a film form, as shown in the electron microscopic photographs of FIGS. 2(a) and (b). Such attachment is believed to render the phosphor particles to be suspectible to coagulation.

Figure 5:
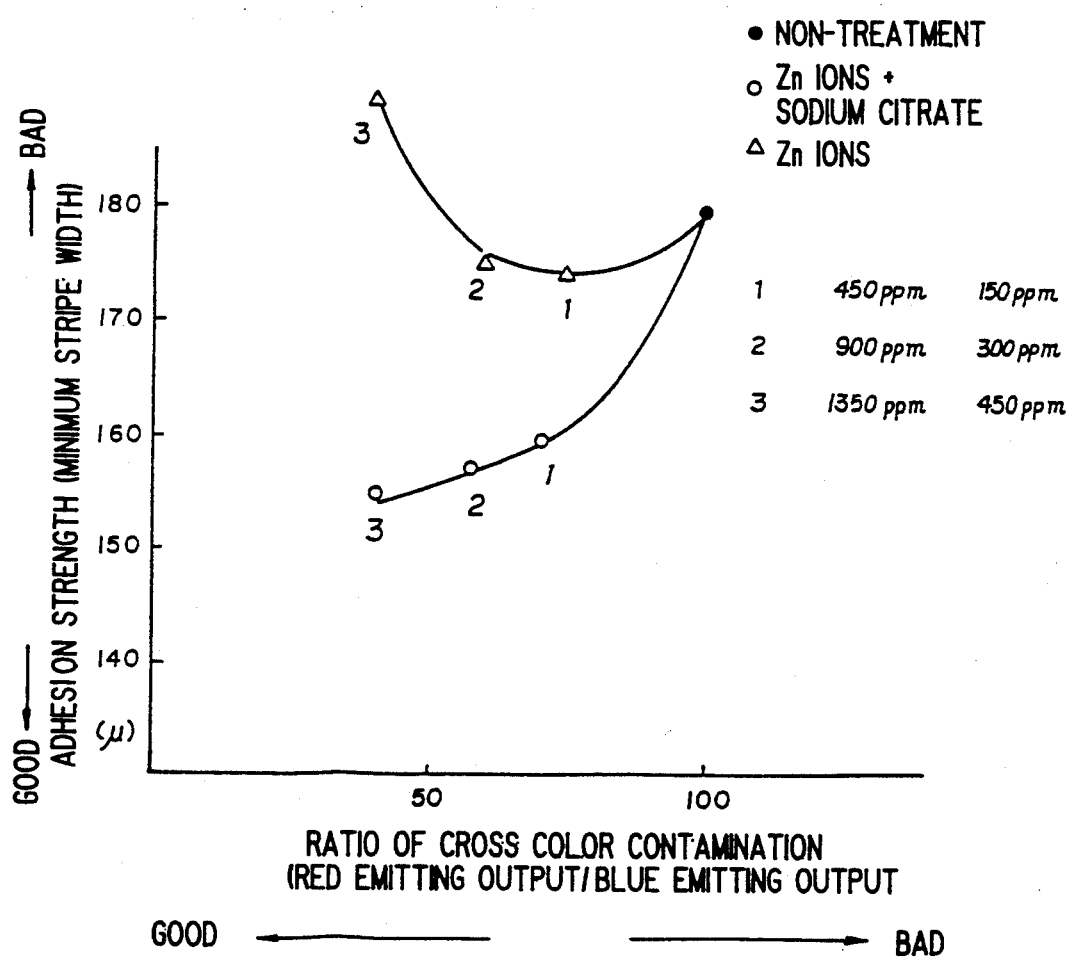
FIG. 5 is a graph showing the relation between adhesion strength and cross color contamination of the present invention phosphor and conventional phosphor.

Now, referring to FIG. 5 wherein the phosphor of the present invention and the above mentioned conventional phosphor were compared with respect to the adhesion strength and the cross contamination (here the cross contamination is represented by the degree of color mixing of the red emitting output to the blue emitting output) in accordance with the coating tests which will be described in detail in Example 1, it is evident that as compared with the black spot representing the phosphor screen wherein the non-treated phosphor was employed, white triangles representing the phosphor screen in which the conventional phosphor was used, show that as the amount of zinc ions increased, the adhesion strength represented by the minimum stripe width decreased although the cross contamination was improved, whereas the white spots representing the phosphor screen in which the phosphor of the present invention was used, show that as the amounts of zinc ions and citric acid ions increased, the cross contamination and the bond strength were improved in the same time.

Thus, according to the present invention, the phosphor surface is treated by adding polycarboxylic acid ions in addition to zinc ions to the phosphor suspension, whereby particles can be attached to the surface, and the adhesion properties and the dispersibility can be improved in addition to the excellent photosensitive properties of the phosphor and the effects for preventing cross color contamination. Further, the present invention has made it possible to produce an excellent color picture tube by a conventional method for the preparation of a phosphor screen.

Now, the present invention will be described in further detail with reference to Examples. However, it should be understood that the present invention is by no means restricted to such specific Examples.

EXAMPLE 1

Into 3 l of deionized water, 1,000 g of $Y_2O_2S:Eu$ red emitting phosphor was introduced and thoroughly suspended. Then, 30 ml of a 1% sodium citrate ($Na_3C_6H_5O_7 \cdot 2H_2O$) solution was added thereto, and the mixture was thoroughly stirred. Then, 40 ml of a 10% zinc sulfate ($ZnSO_4 \cdot 7H_2O$) solution was added thereto, and the mixture was again thoroughly stirred, and a 2% NaOH solution was gradually added thereto under a suspended condition to adjust the pH to 8.5. Thereafter, stirring was continued for 20 minutes, and the mixture was left to stand still for 10 minutes to let the phosphor settle. Then, the supernatant was removed by decantation, and the phosphor was washed once with deionized water. Then, the phosphor was collected by filtration, dehydrated, dried at 120° C. for 15 hours and sieved with a sieve of 300 mesh to obtain a surface-treated phosphor.

Figure 1B:
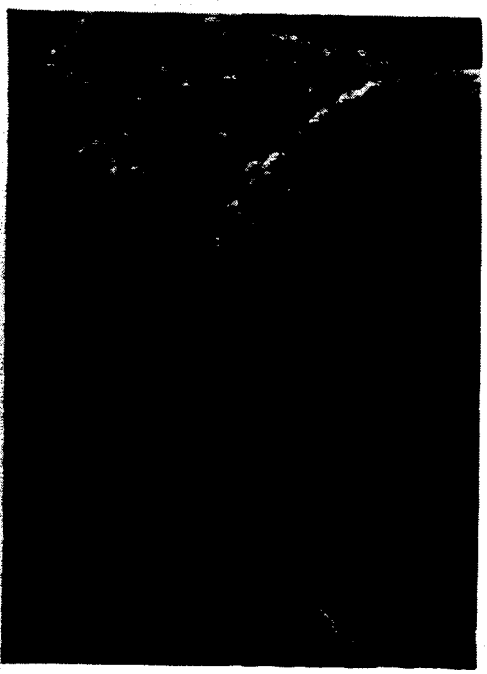

FIGS. 1(a) and (b) show electron microscopic photographs of the phosphor of the present invention thus obtained. FIG. 1(a) is a photograph of 5,000 magnifications, and FIG. 1(b) is a photograph of 20,000 magnifications. It is evident from these photographs that particles which are believed to be zinc compound-containing particles modified with a polycarboxylic acid ions, are uniformly attached to the surface of the phosphor particles.

Figure 2A:
Figure 2B:
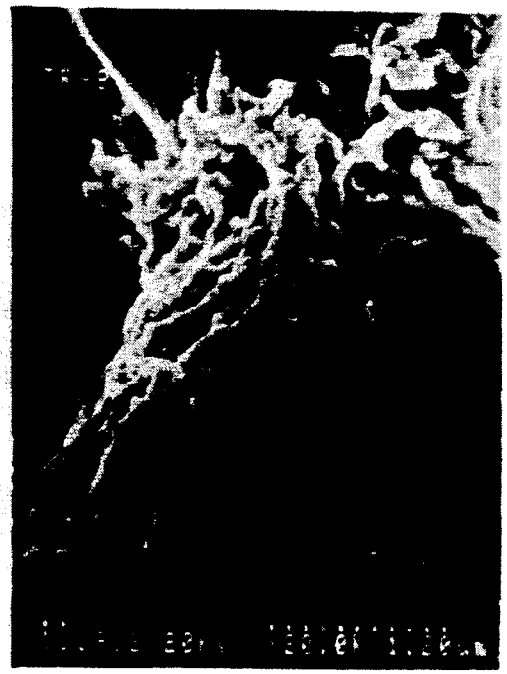

On the other hand, FIGS. 2(a) and (b) are electron microscopic photographs of a phosphor having zinc hydroxide attached to the phosphor surface by adding only zinc ions to the phosphor suspension without using a polycarboxylic acid or a salt thereof. FIG. 2(a) is a photograph of 5,000 magnifications, and FIG. 2(b) is a photograph of 20,000 magnifications. It is evident from these photographs that zinc hydroxide is non-uniformly and flatly deposited on the surface of the phosphor particles.

Figure 6:
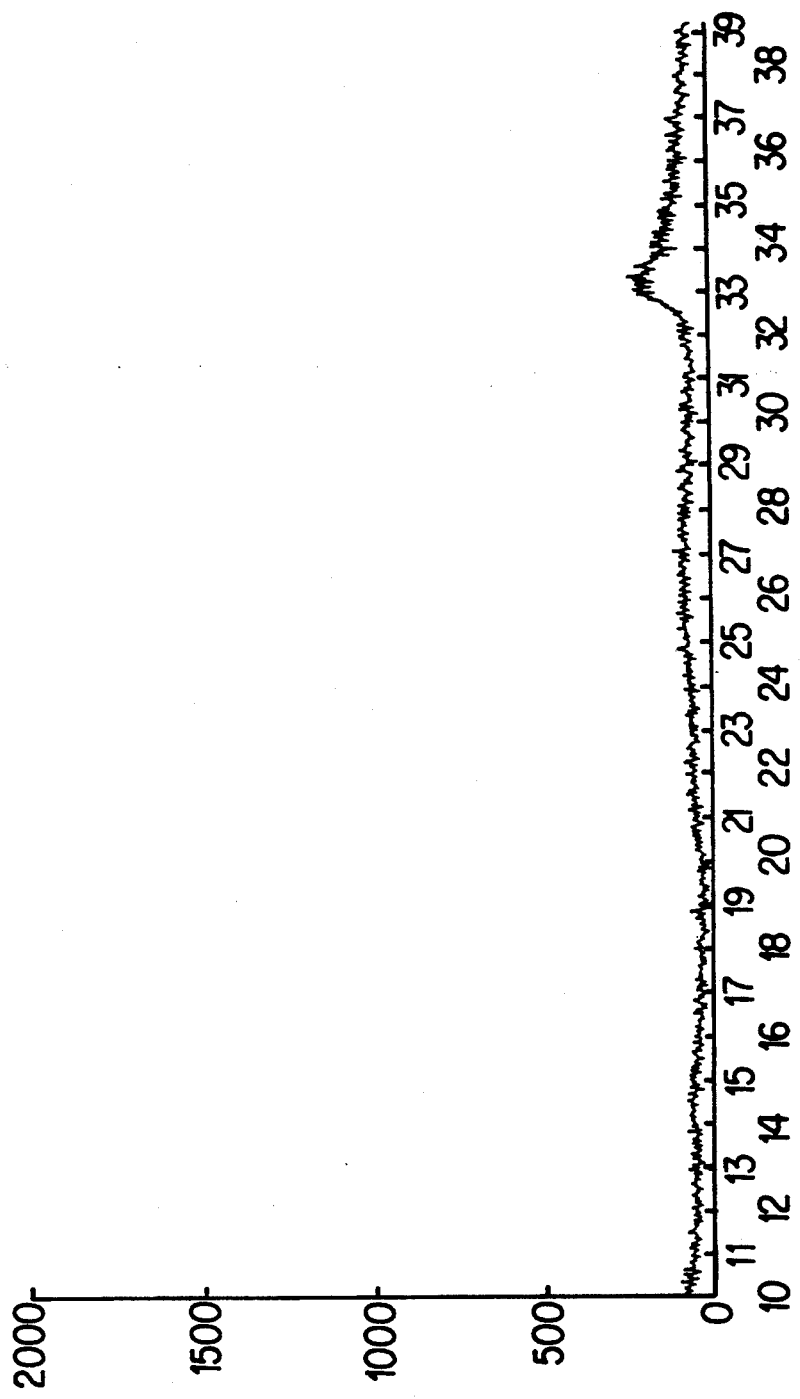
FIG. 6 is the X-ray diffraction diagram of the phosphor in Example 1.
Figure 7:
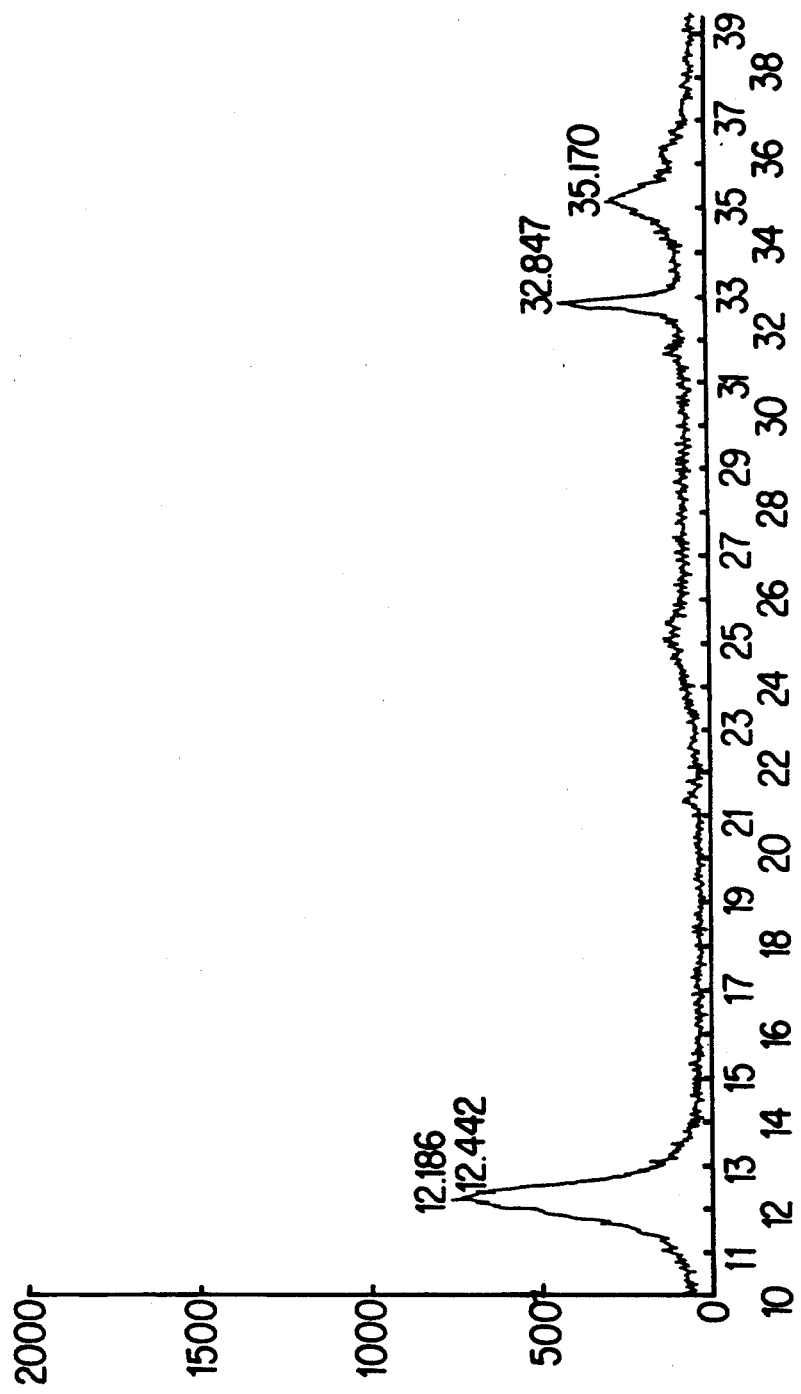
FIG. 7 is the X-ray diffraction diagram of the phosphor of Comparative Example 1.

The crystal structures of the substance attached to the phosphor in FIG. 1 and the substance attached to the phosphor of FIG. 2 were examined by X-ray diffraction, whereby the latter attached substance was found to show a peak of a double salt by $Zn(OH)_2$ and $ZnSO_4$ as shown in FIG. 7, thus indicating attachment of crystals of so-called zinc hydroxide [$6Zn(OH)_2 \cdot ZnSO_4 \cdot 4H_2O$]. However, in the X-ray diffraction of the former, no special peak was observed, as shown in FIG. 6, thus indicating that substance like zinc hydroxide was not formed. The former attached substance is believed to be different from a pure inorganic compound, and it is believed that a zinc compound containing an organic substance (such as zinc polycarboxylate) was formed. Further, in the present invention, if the amount of the polycarboxylic acid added is substantially smaller than the amount of the zinc ions added, zinc hydroxide will be mixed in the zinc compound containing an organic substance, but such will not bring about any particular trouble.

Next, the phosphor thus obtained was formed into a phosphor slurry using an aqueous polyvinyl alcohol containing ammonium dichromate, and a coating test on the panel was conducted to examine the photosensitive properties of the phosphor screen, the bond properties to the panel and the cross contamination (red emitting output/blue emitting output).

Here, the coating test was conducted in such a manner that in front of a shadow mask forming stripe picture elements, a circular filter having the ultraviolet ray transmittance as well as the angle changed, was mounted, and a prescribed dose of ultraviolet rays was uniformly irradiated for exposure, followed by water development, whereupon the attached state of picture elements (stripes) on the panel was inspected.

The results are shown in Table 1.

Further, for the purpose of comparison, a similar test was conducted with respect to a phosphor (amount of zinc deposited; 900 ppm) obtained in the same manner as above except that sodium citrate was omitted during the surface treatment of the phosphor. The results of this Comparative Example are also shown in Table 1.

EXAMPLE 2

Into 3 l of deionized water, 1,000 g of $Y_2O_2S:Eu$ red emitting phosphor was introduced and thoroughly suspended. Then, 10 ml of alumina sol (Alumina sol 100, trade name, manufactured by Nissan Chemical Industries Company Limited, $Al_2O_3:10\%$) diluted with water in an amounts of 10 times the amount of alumina sol, was added, and the mixture was thoroughly stirred. Then, 30 ml of a 1% sodium citrate solution was added thereto, and then 40 ml of a 10% zinc sulfate ($ZnSO_4 \cdot 7H_2O$) solution was added thereto. Then, a 2% NaOH solution was gradually added thereto in a suspended state under adequate stirring to adjust the pH to 8.5.

Thereafter, the treatment was conducted in the same manner as in Example 1, and the evaluation was conducted in the same manner.

The results are shown in Table 2. As is apparent from this Table, in Example 2, substantially the same effects as in Example 1 were obtained. In detail, Example 2 is slightly better than Example 1 with respect to the cross contamination. Further, from the amount of Zn attached by coating (the analytical value), the amount of Zn attached is larger when the alumina sol was used as an assistant, and thus, it is believed that the alumina sol serves to stabilize the attaching.

EXAMPLE 3

Into 3 l of deionized water, 1,000 g of ZnS:Cu,Al green emitting phosphor was introduced and thoroughly suspended. Then, colloidal silica was added thereto in an amount of 0.5% by weight as the silica content relative to the weight of the phosphor, and the mixture was thoroughly stirred.

Thereafter, 35 ml of a 1% potassium tartrate ($K_2C_4H_4O_6 \cdot 0.5H_2O$) solution was added thereto, and the mixture was thoroughly stirred. Then, 40 ml of a 10% zinc sulfate ($ZnSO_4 \cdot 7H_2O$) solution was added thereto, and the mixture was again thoroughly stirred, and a 2% NaOH solution was gradually added in a suspended state to adjust the pH to 8.5.

Thereafter, the treatment was conducted in the same manner as in Example 1, and the evaluation was conducted in the same manner.

The results are shown in Table 3. As is evident from Table 3, excellent effects as in example 1 were obtained.

Further, substantially the same effects as above were obtained also when other carboxylates such as sodium succinate ($Na_2C_4H_4O_4 \cdot 6H_2O$) and potassium hydrogen phthalate ($KC_8H_5O_4$) were used instead of sodium citrate or potassium tartrate of the preceding Examples.

TABLE 1

| $Y_2O_2S:Eu$ phosphor | Preparation conditions | | Screen properties | | | | Powder properties | | | |
|---|---|---|---|---|---|---|---|---|---|---|
| | Amount of sodium citrate | Amount of $Zn^{++}$ | Adhesion angle | Stripe width Maximum | Stripe width Minimum | Cross contamination (Red emitting output/blue emitting output) | Sediment volume in water (5 g of phosphor) | Water wettability (wt %) | Hardness of cake after drying | Amount of Zn attached Analytical value (ppm) |
| Example 1 | 300 ppm | 900 ppm | 250° C. | 225 μm | 145 μm | 94% | 2.1 ml | 14 | soft | 800 |
| Comparative Example 1 | — | 900 ppm | 230° C. | 230 μm | 165 μm | 100% | 2.8 ml | 16 | hard | 880 |

TABLE 2

| Y$_2$O$_2$S:Eu phosphor | Preparation conditions | | | Screen properties | | | | Powder properties | | | |
|---|---|---|---|---|---|---|---|---|---|---|---|
| | Amount of Alumina sol | Amount of sodium citrate | Amount of Zn$^{++}$ | Adhesion angle | Stripe width | | Cross contamination (Red emitting output/blue emitting output) | Sediment volume in water (5 g of phosphor) | Water wettability (wt %) | Hardness of cake after drying | Amount of Zn attached Analytical value (ppm) |
| | | | | | Maximum | Minimum | | | | | |
| Example 2 | 100 ppm | 300 ppm | 900 ppm | 240° C. | 225 μm | 145 μm | 72% | 2.3 ml | 14 | soft | 880 |

TABLE 3

| ZnS:CuAl phosphor | Preparation conditions | | | Screen properties | | | Powder properties | | |
|---|---|---|---|---|---|---|---|---|---|
| | Amount of silica | Amount of sodium tartrate | Amount of Zn$^{++}$ | Adhesion angle | Stripe width | | Sediment volume in water (5 g of phosphor) | Water wettability (wt %) | Hardness of cake after drying |
| | | | | | Maximum | Minimum | | | |
| Example 3 | 0.5 wt % | 350 ppm | 900 ppm | 240° C. | 240 μm | 140 μm | 2.4 ml | 15 | soft |
| Comparative Example 2 | 0.5 wt % | 0 | 900 ppm | 200° C. | 220 μm | 160 μm | 3.1 ml | 18 | hard |

In the coating properties in the Tables, the adhesion angle means the angle of a fan shape from the position on the panel which overlaps the position of the above circular filter where the ultraviolet transmittance of the filter is the maximum (i.e. the position where the phosphor layer is adhered in the most stable state) to the position on the panel where the picture elements start to fall off due to a decrease in the ultraviolet ray transmittance. The larger the adhesion angle, the better the photosensitive properties and the adhesion properties to the panel.

The maximum stripe width means the stripe width at the position where the dose of the ultraviolet rays is maximum. The larger the maximum stripe width, the higher the photosensitive performance. The minimum stripe width is the minimum width of stripes formed in the region where the dose of the ultraviolet rays is minimized by the above circular filter. The smaller the minimum stripe width, the better the bonding properties.

Further, the cross contamination means a color mixing resulting from the deposition of a phosphor on the dots or stripes of another emitting component phosphor already formed, when the second or third emitting component phosphor is subjected to slurry coating, exposure and development to form its dots or stripes. The cross contamination (red emitting output/blue emitting output) in the Tables was obtained in such a manner that a slurry of a red emitting component phosphor was coated on a panel on which stripes of a blue emitting component phosphor were already formed, then dried and developed with warm water without conducting exposure (no stripes of red-phosphor were, of course, formed), the blue stripes of the panel thus obtained were excited with ultraviolet rays of 3,650 Å, and the emitted lights were divided by a half mirror and received by a photo multiplier through red and blue filters, to measure the respective outputs, whereupon the value of red emitting output/blue emitting output was determined. The larger the value, the larger the contamination or color mixing of the red emitting phosphor to the previously coated blue emitting phosphor.

In the powder properties, the sediment volume in water (5 mg of phosphor) is the volume (ml) when 5 g of a phosphor sample was put in 30 g of an aqueous solution, shaked in a sedimentation tube and then permitted to sediment for one hour. The larger the value of this sediment volume, the poorer the dispersibility.

The water wettability is represented by the amount of water required for wetting the entire phosphor when the water was added while vibration was imparted to the phosphor. The smaller the amount of water required, the more readily the preparation of the slurry can be made.

Further, the hardness of cake after drying means that the softer the cake, the better the dispersibility of the phosphor.

From the comparison of Example 1 and Comparative Example 1 in Table 1, it is evident that the phosphor of Example 1 has larger values in both the adhesion angle and the maximum stripe width, and thus indicates the superiority in the photosensitive performance. Further, since the bond angle and the minimum stripe width are large, it is evident that the bonding properties are excellent. Further, since the value of cross contamination (red emitting output/blue emitting output) is small, it is evident that color mixing is suppressed. From the powder properties, it is evident that the phosphor of the Example is excellent in the dispersibility of the powder, since the sediment volume in water was small and the hardness of the cake after drying was soft. Further, since the water wettability is small, the preparation of the slurry is easy.

According to the present invention, by adopting the above construction, it is possible to provide a phosphor which has little cross contamination as a characteristic of the phosphor having zinc hydroxide coated thereon, which maintains excellent properties for photosensitive performance and which has the adhesion properties and dispersibility substantially improved and thus which is suitable for a cathode ray tube, particularly for a color picture tube.

We claim:

1. A phosphor comprising phosphor particles and a surface treating material attached or coated on the phosphor particles, wherein said surface treating material comprises a water-soluble zinc compound and a polycarboxylate.

2. A phosphor comprising phosphor particles and a surface treating material attached or coated on the phosphor particles, wherein said surface treating material provides zinc ions and polycarboxylic acid ions in an aqueous solvent.

3. The phosphor according to claim 1, wherein the surface treating material is a zinc compound modified by carboxyl group.

4. The phosphor according to claim 1, wherein the surface treating material is a zinc compound containing zinc polycarboxylate.

5. A method for treating the surface of a phosphor, which comprises adding to a suspension of the phosphor a surface treating agent which provides zinc ions and polycarboxylic acid ions in an aqueous solvent, and adjusting the pH to a level of from 6.5 to 10 with an alkaline solution.

6. The method according to claim 5, wherein the surface treating agent which provides polycarboxylic acid ions in an aqueous solvent is a polycarboxylic acid and/or a polycarboxylate.

7. The method according to claim 6, wherein the polycarboxylic acid and/or the polycarboxylate are oxalic acid, tartaric acid, malic acid, citric acid, succinic acid, malonic acid, maleic acid, fumaric acid, phthalic acid, tricarballylic acid and their salts, which have at least two carboxyl groups per molecule.

8. The method according to claim 5, wherein the amount of the polycarboxylic acid ions is within a range of from 50 to 10,000 ppm relative to the weight of the phosphor in the phosphor suspension.

9. The method according to claim 5, wherein the surface treating agent which provides zinc ions in an aqueous medium is a water-soluble zinc compound.

10. The method according to claim 9, wherein the water-soluble zinc compound is at least one member selected from the group consisting of zinc sulfate, zinc acetate, zinc nitrate, zinc chloride, zinc bromide and zinc iodide.

11. The method according to claim 5, wherein the amount of the zinc ions is within a range of from 100 to 30,000 ppm relative to the weight of the phosphor in the phosphor suspension.

12. The method according to claim 5, wherein the alkaline solution is a solution of at least one member selected from the group consisting of sodium hydroxide, potassium hydroxide and ammonium hydroxide.

13. The method according to claim 5, wherein an assistant to stabilize the attaching of the surface treating material to the phosphor, is used in combination.

14. A process for producing a phosphor screen, which comprises coating a phosphor on the surface of a panel, followed by baking, wherein said phosphor comprises phosphor particles and a surface treating material attached or coated on the phosphor particles, said surface treating material comprising a water-soluble zinc compound and a polycarboxylic acid.

* * * * *